(12) United States Patent
Glatfelter et al.

(10) Patent No.: US 10,507,901 B2
(45) Date of Patent: Dec. 17, 2019

(54) PROTECTING AND ENSURING READINESS OF A VEHICLE

(71) Applicant: THE BOEING COMPANY, Chicago, IL (US)

(72) Inventors: John W Glatfelter, Kennett Square, PA (US); John A Lepore, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 274 days.

(21) Appl. No.: 15/616,651

(22) Filed: Jun. 7, 2017

(65) Prior Publication Data
US 2018/0354606 A1 Dec. 13, 2018

(51) Int. Cl.
*B64C 3/56* (2006.01)

(52) U.S. Cl.
CPC ..................... *B64C 3/56* (2013.01)

(58) Field of Classification Search
CPC ..... B64C 3/56; B64C 2201/102; B64F 1/222; Y02T 50/14; Y02T 50/44; B60F 5/02; E05F 15/70; E05F 15/71; E05F 15/72; E05F 15/79
USPC ......................................... 701/3, 49; 244/49
See application file for complete search history.

(56) References Cited

U.S. PATENT DOCUMENTS

| | | | | |
|---|---|---|---|---|
| 5,310,138 A | * | 5/1994 | Fitzgibbon | B64C 3/56 244/49 |
| 5,381,986 A | * | 1/1995 | Smith | B64C 3/56 244/49 |
| 5,427,329 A | * | 6/1995 | Renzelmann | B64C 3/56 244/49 |
| 6,260,799 B1 | * | 7/2001 | Russ | B64C 3/56 244/49 |
| 8,733,692 B2 | * | 5/2014 | Kordel | B64C 3/56 244/49 |
| 2006/0038673 A1 | * | 2/2006 | Chapman | G07C 9/00714 340/528 |
| 2008/0034671 A1 | * | 2/2008 | Harrington | E06B 9/00 52/2.26 |
| 2008/0222964 A1 | * | 9/2008 | Longuemare | E05F 15/643 49/506 |
| 2009/0302151 A1 | * | 12/2009 | Holmes | B64C 3/56 244/49 |
| 2010/0230532 A1 | * | 9/2010 | Dietrich | B60F 5/02 244/49 |
| 2011/0036938 A1 | * | 2/2011 | Blomeley | B64C 3/56 244/2 |

(Continued)

*Primary Examiner* — Richard A Goldman
(74) *Attorney, Agent, or Firm* — Coats & Bennett, PLLC

(57) ABSTRACT

A computing device obtains environmental data, capability data corresponding to a vehicle, and a readiness criteria specifying a maximum time to transition the vehicle from an idle state to an active state. The computing device determines an action that satisfies the readiness criteria and protects the vehicle from a forthcoming environmental condition indicated by the environmental data. In particular, determining the action is based on the environmental data, the capability data, and the readiness criteria. The computing device outputs a control signal, to an actuator, that controls the actuator to mechanically orient part of the vehicle and/or part of a structure in which the vehicle is located to at least partly implement the action.

20 Claims, 6 Drawing Sheets

(56) References Cited

U.S. PATENT DOCUMENTS

| | | | |
|---|---|---|---|
| 2011/0036939 A1* | 2/2011 | Easter | B60F 5/02 244/2 |
| 2012/0012692 A1* | 1/2012 | Kroo | B64C 3/56 244/6 |
| 2014/0014768 A1* | 1/2014 | Lassen | B64C 3/56 244/49 |
| 2014/0288784 A1* | 9/2014 | Van Wiemeersch | E05F 15/77 701/46 |
| 2014/0306067 A1* | 10/2014 | Guida | B64C 23/076 244/199.4 |
| 2015/0014478 A1* | 1/2015 | Lassen | B64C 3/56 244/49 |
| 2015/0210377 A1* | 7/2015 | Good | B64C 3/56 244/49 |
| 2015/0367960 A1* | 12/2015 | Dyanzio | B64F 1/228 701/28 |
| 2016/0185444 A1* | 6/2016 | Gionta | B64C 3/56 244/49 |
| 2016/0368594 A1* | 12/2016 | Cazals | B64C 3/38 |
| 2016/0378120 A1* | 12/2016 | Creasman | B64C 3/546 701/2 |
| 2017/0204651 A1* | 7/2017 | Gussen | G07C 9/00174 |
| 2018/0072414 A1* | 3/2018 | Cantrell | B64C 3/42 |
| 2019/0051067 A1* | 2/2019 | Witkowski | E05F 15/60 |
| 2019/0051071 A1* | 2/2019 | Lickfelt | E05F 15/73 |

* cited by examiner

PROTECTING AND ENSURING READINESS OF A VEHICLE

TECHNICAL FIELD

The present disclosure generally relates to the field of safety system controls, and more particularly to the field of control devices that protect and ensure the readiness of vehicles.

BACKGROUND

The readiness of a vehicle to be used is often critical. In particular, vehicles relied upon to fulfill emergency, life-saving, public safety, mass transportation, commercial, and/or military roles often need to respond to urgent matters with very little advance notice. Particular examples of such vehicles include aircraft tasked with police, fire, medical, or national defense missions. Environmental factors, such as adverse weather conditions, commonly interfere with the readiness of such vehicles, thereby endangering the missions for which they are purposed.

SUMMARY

The present disclosure relates to methods, apparatuses, systems, computer program products, software, and/or mediums for protecting, and ensuring readiness of, a vehicle. According to the present disclosure, an action is determined that protects, and satisfies readiness criteria of, a vehicle, and a corresponding control signal is output to an actuator that mechanically orients part of the vehicle and/or part of a structure in which the vehicle is located to at least partly implement the action. According to some aspects herein, the vehicle is capable of being manned. According to some aspects herein, the vehicle is capable of operating unmanned. According to particular aspects herein, the vehicle is an aircraft, spacecraft, rotorcraft, satellite, rocket, terrestrial vehicle, surface water borne vehicle, sub-surface water borne vehicle, subterranean vehicle, or any combination thereof.

According to an aspect of the disclosure, a method implemented in a computing device is disclosed. The method comprises obtaining environmental data, capability data corresponding to a vehicle, and a readiness criteria specifying a maximum time to transition the vehicle from an idle state to an active state. The method further comprises determining an action that satisfies the readiness criteria and protects the vehicle from a forthcoming environmental condition indicated by the environmental data, wherein determining the action is based on the environmental data, the capability data, and the readiness criteria. The method further comprises outputting a control signal, to an actuator, that controls the actuator to mechanically orient part of the vehicle and/or part of a structure in which the vehicle is located to at least partly implement the action.

According to a further aspect, determining the action comprises using the environmental data, capability data, and/or readiness criteria to identify a previously-determined action from a database and to determine whether the previously-determined action was accepted or rejected.

In a further aspect, the vehicle is an aircraft, the idle state is a parked state, and the active state is an airborne state. Further, the control signal controls the actuator such that the aircraft is able to transition from the parked state to the airborne state within the maximum time.

In a further aspect, determining the action that satisfies the readiness criteria comprises determining that the vehicle is at a location suitable for satisfying the readiness criteria under the forthcoming environmental condition.

In a further aspect, determining the action that satisfies the readiness criteria comprises determining to secure the structure in which the vehicle is located against the forthcoming environmental condition. Further, outputting the control signal comprises outputting a signal to mechanically orient the part of the structure in which the vehicle is located.

In a further aspect, determining the action that satisfies the readiness criteria comprises determining to change a physical configuration of the vehicle to secure the vehicle against the forthcoming environmental condition. Further, outputting the control signal comprises outputting a signal to mechanically orient the part of the vehicle.

In a further aspect, determining the action comprises selecting the action from a plurality of preconfigured actions.

In a further aspect, the method further comprises notifying a user of the action, wherein outputting the control signal is responsive to receiving notice that the action is accepted.

In a further aspect, the capability data indicates a safety threshold to transition the vehicle from the idle state to the active state.

In another aspect of the disclosure, a computing device comprises interface circuitry and processing circuitry communicatively coupled to the interface circuitry. The interface circuitry configured to send and receive data. The processing circuitry is configured to obtain, via the interface circuitry, environmental data, capability data corresponding to a vehicle, and a readiness criteria specifying a maximum time to transition the vehicle from an idle state to an active state. The processing circuitry is further configured to determine an action that satisfies the readiness criteria and protects the vehicle from a forthcoming environmental condition indicated by the environmental data, wherein determining the action is based on the environmental data, the capability data, and the readiness criteria. The processing circuitry is yet further configured to output a control signal, via the interface circuitry to an actuator, that controls the actuator to mechanically orient part of the vehicle and/or part of a structure in which the vehicle is located to at least partly implement the action.

In a further aspect, the computing device is configured to perform any of the methods described herein.

Further aspects are directed to include systems, computer program products, and/or software that correspond to one or more of the methods described herein.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter generally, whereas discussion of a specific instance of an illustrated element will append a letter designation thereto (e.g., discussion of an actuator 120, generally, as opposed to discussion of particular instances of actuators 120a, 120b).

DETAILED DESCRIPTION

Aspects of the present disclosure are directed to methods, apparatuses, systems, computer program products, and/or software for protecting, and ensuring readiness of, a vehicle. According to the present disclosure, an action is determined that protects, and satisfies readiness criteria of, a vehicle, and a corresponding control signal is output to an actuator that mechanically orients part of the vehicle and/or part of a structure in which the vehicle is located to at least partly implement the action.

Figure 1:
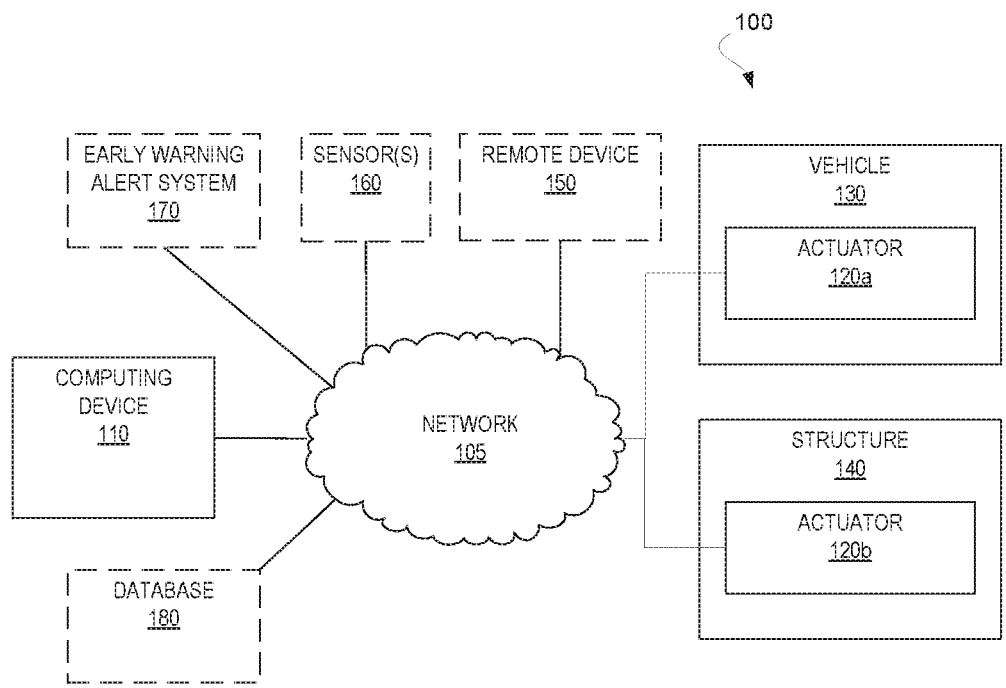
FIG. 1 is a block diagram illustrating an example system according to an aspect of the present disclosure.

FIG. 1 illustrates an example system 100 according to an aspect of the disclosure. The example system 100 comprises a computing device 110, network 105, vehicle 130, and structure 140. The vehicle 130 and structure 140 each comprise an actuator 120a, 120b, respectively. The computing device 110, remote device 150, and actuators 120a, 120b are each communicatively coupled to, and exchange signals with each other via, the network 105. In particular, the computing device 110 sends a control signal to actuator 120a and/or 120b via the network 105 to mechanically orient part of the vehicle 130 and/or part of the structure 140.

Each actuator 120a, 120b is configured to convert energy into mechanical motion to perform such mechanical orientation responsive to an appropriate control signal from the computing device 110. According to particular aspects, actuator 120a and/or actuator 120b comprises a mechanism to convert electrical current, hydraulic fluid pressure, and/or pneumatic pressure into such mechanical motion.

The vehicle 130 is in an idle state within the structure 140, and has a readiness criteria that specifies a maximum time to transition the vehicle 130 from the idle state to an active state. In one such example, the vehicle 130 is an air ambulance that has a readiness criteria of transitioning from parked in the structure 140 to airborne within five minutes.

The amount of time required for the aircraft to transition from idle to active depends on the particular capabilities of the vehicle 130. For example, different aircraft often require different amounts of time to complete a successful takeoff. In particular, a very large passenger aircraft commonly takes much longer to complete its takeoff procedure than a single-seat recreational aircraft.

The computing device 110 obtains environmental data, capability data corresponding to the vehicle 130, and the readiness criteria, and based thereon, the computing device 110 determines an action that satisfies the readiness criteria and protects the vehicle 130 from a forthcoming environmental condition (e.g., strong winds, earthquake, high rainfall, high or low pressure, and/or extreme temperature) indicated by the environmental data. The computing device 110 outputs a control signal, to an actuator 120 (e.g., actuator 120a, actuator 120b), that controls the actuator 120 to mechanically orient part of the vehicle 130 and/or part of the structure 140 in which the vehicle 130 is located to at least partly implement the action. According to particular aspects, mechanically orienting part of the vehicle 130 and/or part of the structure 140 secures the vehicle 130 and/or structure 140 against the forthcoming environmental condition, as will be explained further below.

According to an aspect, the system 100 comprises one or more sensors 160 from which the environmental data is obtained. According to particular aspects, the sensor(s) 160 comprise a barometer, an anemometer, a thermometer, and/or a seismometer. Although the sensor(s) 160 are depicted in FIG. 1 as a separate device that is communicatively connected to the computing device 110 via the network 105, according to other aspects of the disclosure, the sensor 160 is comprised in computing device 110, the vehicle 130 or the structure 140.

According to another aspect, the system 100 comprises an early warning alert system 170 from which the environmental data is additionally or alternatively obtained, e.g., via a Rich Site Summary (RSS) feed. Typical examples of the early warning alert system 170 include, without limitation, a computer within a National Oceanic and Atmospheric Administration (NOAA) system, a United States Geological Survey (USGS) system, a Department of Homeland Security (DHS) system, a Department of Defense (DOD) system, a National Security Agency (NSA) system, and/or a Center for Disease Control (CDC) system.

According to another aspect, the capability data and/or readiness criteria are obtained from a database 180 that is communicatively connected to the computing device 110 via the network 105. Additionally or alternatively, the capability data and/or readiness criteria are obtained from a user of the computing device 110. According to particular aspects, the capability data in particular indicates a safety threshold to transition the vehicle 130 from the idle state to the active state.

Typical examples of the computing device 110 include, without limitation, a personal computer, a laptop computer, a desktop computer, a workstation, a smartphone, a tablet computer, a wearable computer, and/or a smart appliance. Other examples of the computing device 110 include a server computer, a server cluster, network attached storage, and/or a storage area network.

Typical examples of the vehicle 130, without limitation, include a manned vehicle, an unmanned vehicle, an aircraft, a spacecraft, a rotorcraft, a satellite, a rocket, a terrestrial vehicle, a surface water borne vehicle, a sub-surface water borne vehicle, a subterranean vehicle and any combination thereof.

The structure 140 is such that is appropriate to contain the vehicle 130. Typical examples of the structure 140 include, without limitation, a hangar, a garage, and a dock.

The network 105 includes one or more physical devices and/or signaling mediums capable of exchanging communication signals with the computing device 110, remote device 150, and actuators 120a, 120b. Examples of such a network 105 include (but are not limited to) the Internet (or a portion thereof); one or more local area networks; one or more wireless networks; one or more cellular networks; one or more Internet Protocol-based networks; one or more Ethernet networks; one or more optical networks; and/or one or more circuit switched networks. According to particular aspects, the network 105 comprises any number of networking devices such as routers, gateways, switches, hubs, firewalls, and the like (not shown), individually or in any combination, in support of the exchange of such communication signals.

Although the example system 100 illustrated in FIG. 1 includes two actuators 120a, 120b, other examples in accordance with other aspects of the present disclosure include one or more actuators 120 in one or more vehicles 130 and/or one or more actuators 120 in one or more structures 140.

Particular aspects also include remote device 150. According to such aspects, the remote device 150 receives a notification from the computing device 110 that proposes an action, as will be discussed further below. At the direction of a user (e.g., a system administrator and/or airport manager), the remote device 150 responds to such a notification with an approval or rejection of the action. In some aspects of the present disclosure the remote device 150 is, additionally or alternatively, a different computing device 110 that controls different actuators 120 from those illustrated in FIG. 1, and shares, with the computing device 110, information about the action(s) it has taken with respect to its own vehicle(s) 130 and/or structure(s) 140.

Typical examples of the remote device 150 include, without limitation, a personal computer, a laptop computer, a desktop computer, a workstation, a smartphone, a tablet computer, a wearable computer, and/or a smart appliance. Other examples of the remote device 150 include a server computer, a server cluster, network attached storage, and/or a storage area network.

Figure 2:
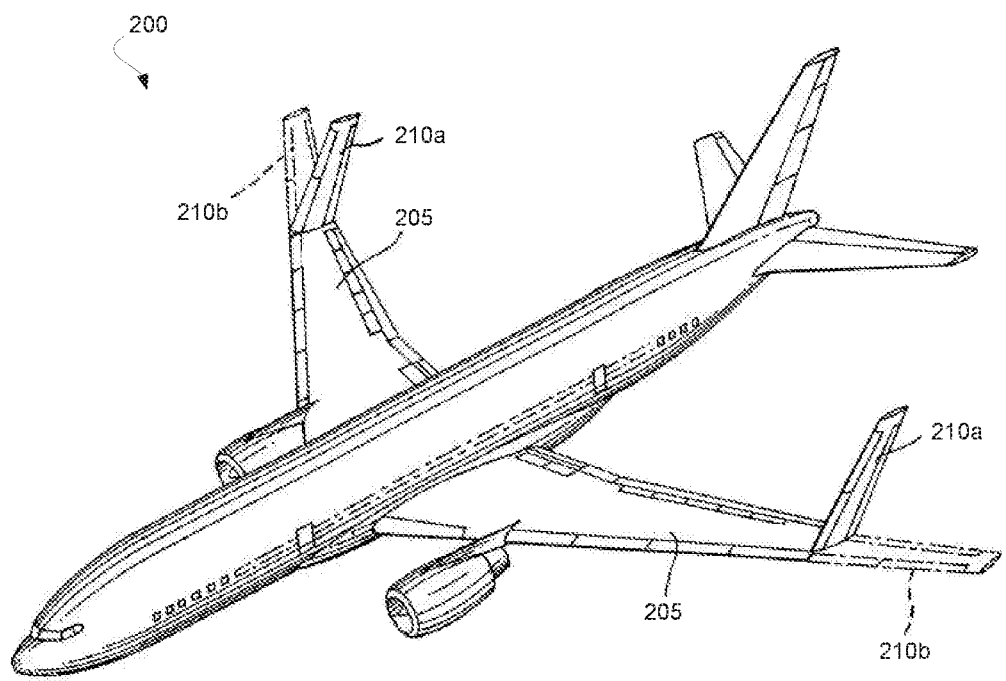
FIG. 2 is an illustration of an example aircraft according to an aspect of the present disclosure.

FIG. 2 illustrates an aircraft 200, which is an example of a vehicle 130 consistent with particular aspects of the present disclosure. The aircraft 200 includes wings 205, the tips of which are mechanically-orientable between positions 210a and 210b by one or more actuators 120 (not shown) responsive to a control signal from the computing device 110. Other examples of vehicles 130 that have mechanically-orientable parts include vehicles 130 with a foldable rotor, tail, propeller, door, canopy, and/or other part.

In position 210a, the aircraft 200 is more resilient against certain environmental factors, such as wind. In an aspect, the wings 205 in position 210a generate less lift in response to wind such that the aircraft 200 not need be tied down and/or otherwise protected, provided that the wind is below a given threshold. When the wings 205 are in position 210a, the aircraft 200 takes longer to transition to the active state of being airborne, as the configuration of the aircraft 200 must be changed to include position 210b for takeoff. The computing device 110 determines whether to change the physical configuration of the vehicle 130 to secure the vehicle 130 against a forthcoming environmental condition based on the environmental data, capability data corresponding to the vehicle 130, and readiness criteria. According to particular aspects, the computing device 110 makes this determination such that the aircraft 200 is able to transition from the parked state to the airborne state within the maximum time specified by the readiness criteria.

Figure 3:
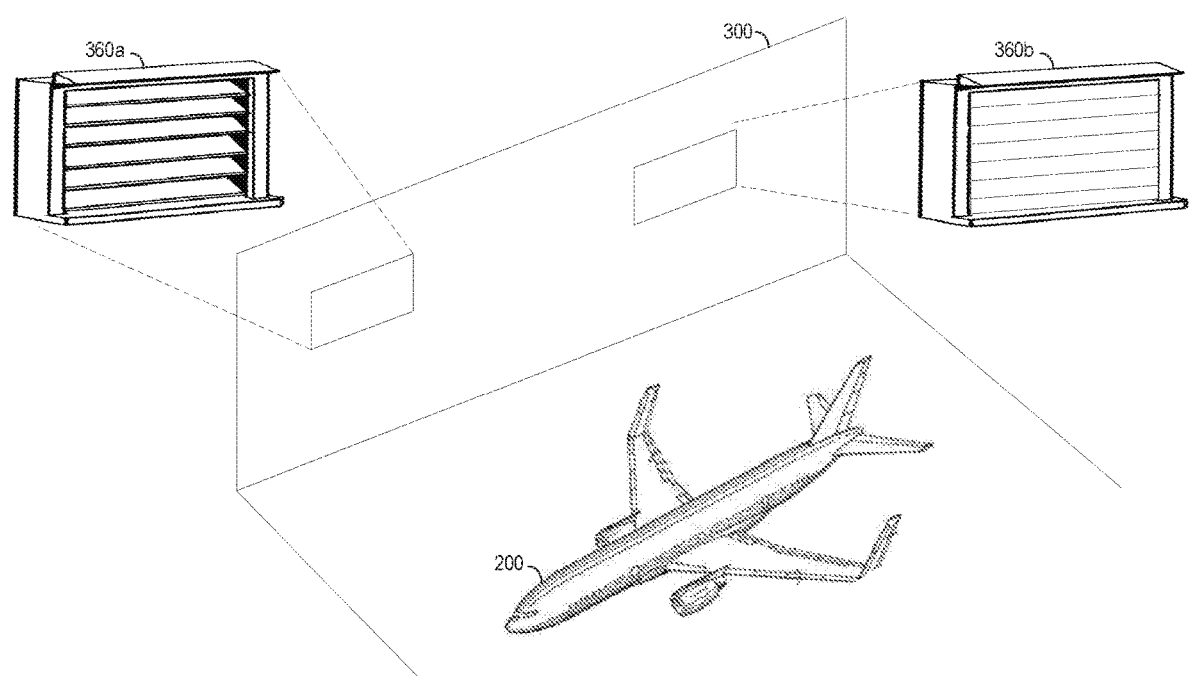
FIG. 3 is a cut-away illustration of an example structure containing an aircraft according to an aspect of the present disclosure.

FIG. 3 illustrates a hangar 300, which is an example of a structure 140 consistent with particular aspects of the present disclosure. The hangar 300 houses the aircraft 200, which is parked in an idle state within. The hangar 300 comprises louvers 360a and 360b. The louvers 360a and 360b are mechanically-orientable (individually or collectively) between an open position (as shown by louver 360a) and a closed position (as shown by louver 360b) by one or more actuators 120 (not shown) responsive to a control signal from the computing device 110.

Other examples of structures 140 that have mechanically-orientable parts include structures 140 with a movable door, roof, port, window, and/or other part. The computing device 110 determines whether to secure the structure 130 (e.g., by mechanically orienting such part(s)) against a forthcoming environmental condition based on the environmental data, capability data corresponding to the vehicle 130, and readiness criteria. In some aspects, mechanically orienting part of the structure 140 avoids the need to mechanically orient part of the vehicle 130. For example, under certain environmental conditions, closing the louvers 360a, 360b avoids the need to fold the wings 205 of the aircraft 200, thereby keeping the aircraft 200 in a greater state of readiness. Other aspects have the opposite effect. For example, in an aspect, closing a door to the hangar 300 increases the time required to transition the aircraft 200 from the idle state to the active state, regardless of whether the wings 205 are folded into position 210a or not. The determination of whether to secure the hangar 300 against a forthcoming environmental condition is such that the aircraft 200 is able to transition from the parked state to the airborne state within the maximum time specified by the readiness criteria.

Figure 4:
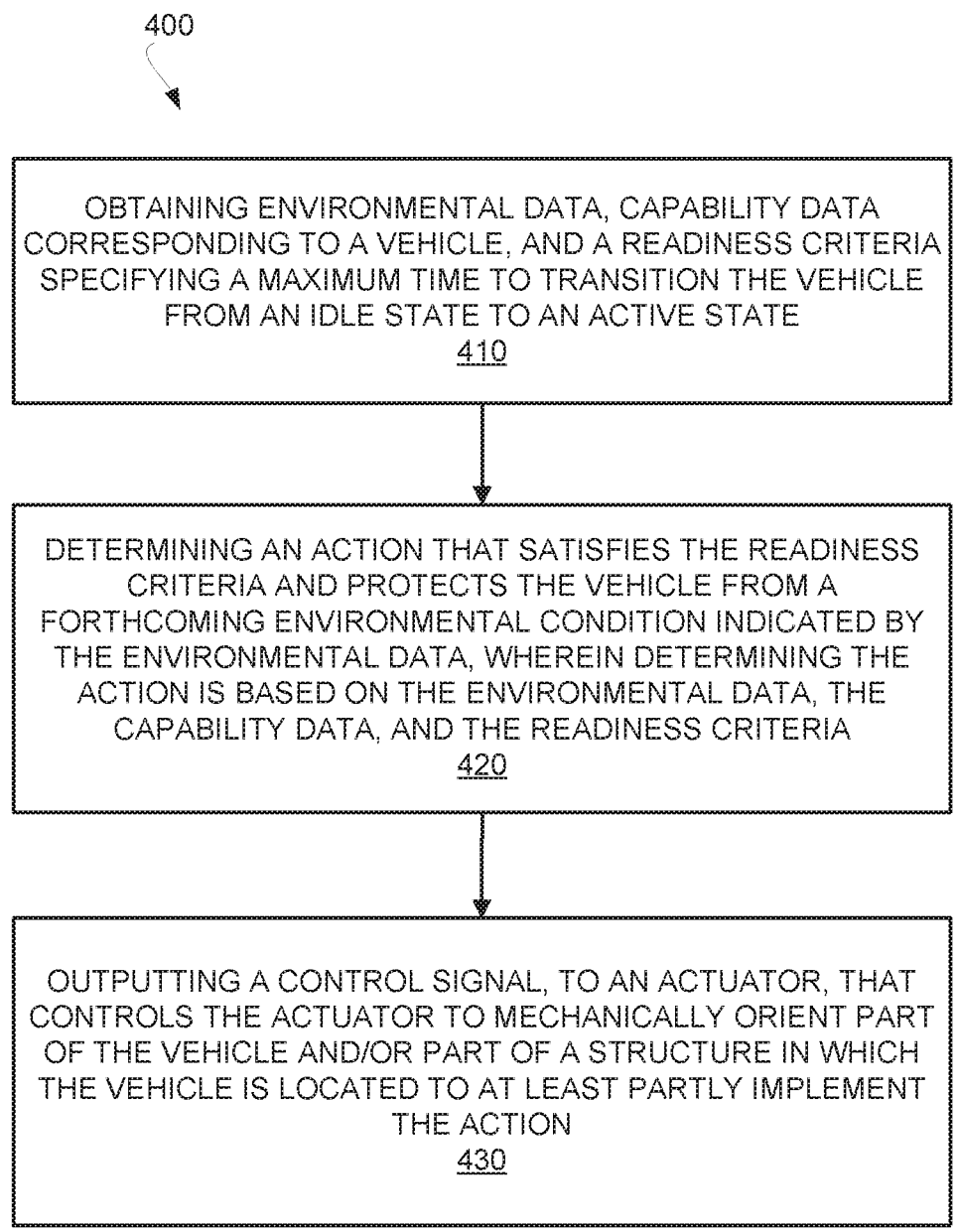
FIG. 4 is a flow diagram illustrating an example method according to an aspect of the present disclosure.

In view of the above, FIG. 4 illustrates an example method 400 implemented in a computing device 110, consistent with one or more aspects described herein. The method 400 comprises obtaining environmental data, capability data corresponding to a vehicle 130, and a readiness criteria specifying a maximum time to transition the vehicle 130 from an idle state to an active state (block 410). The method 400 further comprises determining an action that satisfies the readiness criteria and protects the vehicle 130 from a forthcoming environmental condition indicated by the environmental data (block 420). Determining the action is based on the environmental data, the capability data, and the readiness criteria. The method 400 further comprises outputting a control signal, to an actuator 120, that controls the actuator 120 to mechanically orient part of the vehicle 130 and/or part of a structure 140 in which the vehicle 130 is located to at least partly implement the action (block 430).

Figure 5:
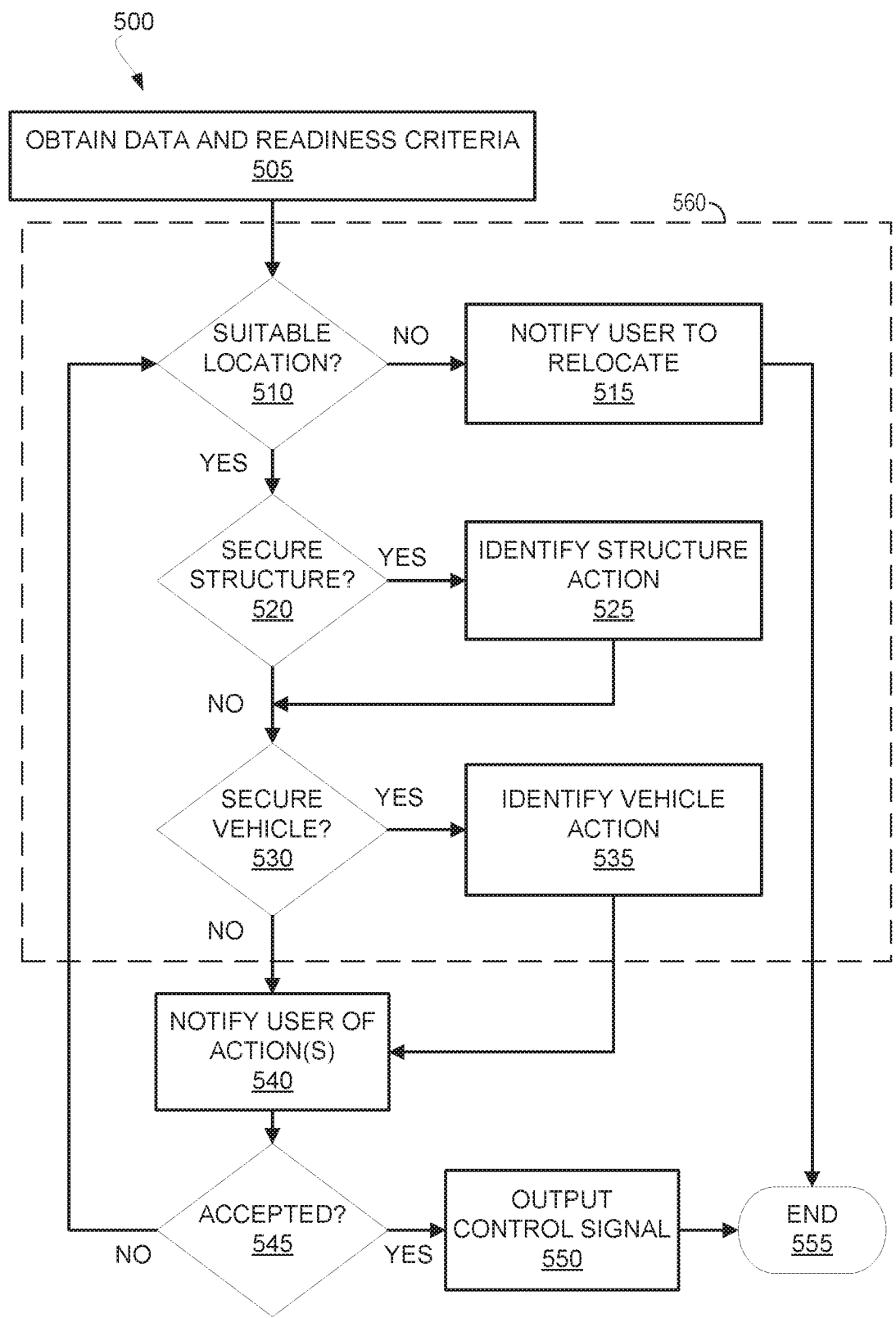
FIG. 5 is a flow diagram illustrating a more detailed example method according to an aspect of the present disclosure.

FIG. 5 illustrates a more detailed example method 500 implemented by the computing device 110, consistent with one or more aspects described herein. According to the method 500, the computing device 110 obtains environmental data, capability data corresponding to a vehicle 130, and a readiness criteria specifying a maximum time to transition the vehicle 130 from an idle state to an active state (block 505). According to particular aspects, obtaining this information enables the computing device 110 to determine an action for the vehicle 130 that is suitable (and in some cases, optimal) for particular circumstances.

The computing device 110 then determines an action that satisfies the readiness criteria and protects the vehicle 130 from a forthcoming environmental condition indicated by the environmental data (group 560). Determining the action is based on the environmental data, the capability data, and the readiness criteria. According to particular aspects, determining this action enables the computing device 110 to ensure the safety of the vehicle 130 without jeopardizing the readiness of the vehicle 130.

In particular, according to the method 500, determining the action that satisfies the readiness criteria comprises determining whether the vehicle 130 is at a location suitable for satisfying the readiness criteria under the forthcoming environmental condition (block 510). According to some aspects, determining whether the vehicle 130 is at a location suitable for satisfying the readiness criteria enables the computing device 110 to identify whether or not the user needs to relocate the vehicle 130 in order to ensure vehicle readiness and protection.

If the computing device 110 determines that the vehicle 130 is not at a location suitable for satisfying the readiness criteria, (block 510, no), the user is notified to relocate the vehicle 130 (block 515) and the method 500 ends (block 555). According to particular aspects, notifying the user to relocate the vehicle 130 provides the user with the opportunity to maintain vehicle readiness and protection for the vehicle 130 at a different location.

If the computing device 110 determines that the vehicle 130 is at a location suitable for satisfying the readiness criteria (block 510, yes), determining the action that satisfies the readiness criteria further comprises determining whether to secure the structure 140 in which the vehicle 130 is located against the forthcoming environmental condition (block 520). According to particular aspects, determining whether to secure the structure 140 in which the vehicle 130 is located allows the computing device 110 to determine whether certain protective measures provided by the structure 140 are adequate to protect the vehicle 130 and maintain the vehicle's 130 readiness, and if not, determine that additional or alternative measures are required.

If the computing device 110 determines to secure the structure 140 in which the vehicle 130 is located against the forthcoming environmental condition (block 520, yes), the computing device 110 identifies an action that secures the structure 140 (block 525). Otherwise (block 520, no), identifying the action that secures the structure 140 is skipped. In some aspects, identifying the action that secures the structure 140 enables the computing device 110 to determine an appropriate control signal to output to an actuator 120b that mechanically orients a part of the structure 140 in which the vehicle 130 is located to at least partly secure the structure 140.

In some aspects, identifying the action to secure the structure 140 includes using the environmental data, capability data, and/or readiness criteria to identify a previously-determined action from a database 180 and to determine whether the previously-determined action was accepted or rejected. In some aspects, this enables the computing device 110 to use previous feedback to improve subsequent proposals by the computing device 110. In particular aspects, this enables the computing device 110 to avoid proposing or taking an action that has previously been rejected, and/or to favor an action that has previously been accepted.

In some aspects, the database 180 is stored locally and/or at a remote device 150. In some aspects storing the database 180 locally and/or at a remote device 150 provides the computing device 110 with a knowledge base of previously accepted/rejected actions from one or more locations that are relevant to the location of the computing device 110.

In some aspects, identifying the action to secure the structure 140 includes selecting the action from a plurality of preconfigured actions. In some aspects, this allows a user to configure particular actions in advance that involve the structure 140 and are acceptable for use in protecting the vehicle 130 and/or maintaining vehicle readiness under particular conditions.

According to the method 500, determining the action that satisfies the readiness criteria further comprises determining whether to change a physical configuration of the vehicle 130 to secure the vehicle 130 against the forthcoming environmental condition (block 530). According to particular aspects, determining whether to change the physical configuration of the vehicle 130 to secure the vehicle 130 enables the computing device 110 to determine whether certain protective measures provided by the vehicle 130 itself are adequate to protect the vehicle 130 and maintain the vehicle's 130 readiness, and if not, determine that additional or alternative measures are required.

If the computing device 110 determines to change the physical configuration of the vehicle 130 to secure the vehicle 130 against the forthcoming environmental condition (block 530, yes), the computing device 110 identifies an action that secures the vehicle 130 (block 535). Otherwise (block 530, no), identifying the action that secures the vehicle 130 is skipped. In some aspects, identifying the action that secures the vehicle 130 enables the computing device 110 to determine an appropriate control signal to output to an actuator 120a that mechanically orients a part of the vehicle 130 to at least partly secure the vehicle 130.

Aspects of the present disclosure identify the action that secures the vehicle 130 in similar fashion as those described above to identify an action that secures the structure 140 and have similar benefits. As such, particular aspects of identifying the action that secures the vehicle 130 include using the environmental data, capability data, and/or readiness criteria to identify a previously-determined action from a database 180 and determine whether the previously-determined action was accepted or rejected. In some aspects, the database 180 is stored locally and/or at a remote device 150. In some aspects, identifying the action to secure the vehicle 130 includes selecting the action from a plurality of preconfigured actions.

The method 500 further comprises notifying a user of the determined action(s), e.g., via a display of the computing device 110 and/or via the network 105 (block 540). In some aspects, notifying the user enables the user to accept or reject the determined action. In some aspects notifying the user enables the user to identify, and later cancel, a particular action (e.g., after the relevant environmental condition has subsided).

The method 500 further comprises determining whether the action is accepted or rejected (block 545). If the computing device 110 receives notice that the action is rejected (e.g., from the user) (block 545, no), the computing device 110 determines a different action that satisfies the readiness criteria and protects the vehicle 130 from the forthcoming environmental condition (block 560), e.g., by reevaluating whether the vehicle 130 is in a suitable location (block 510), whether to secure the structure 140 (block 520), and/or whether to secure the vehicle 130 (block 530), consistent with various aspects as described above.

Responsive to the computing device 110 receiving notice that the action is accepted (e.g., from the user) (block 545, yes), the computing device 110 outputs a control signal, to an actuator 120, that controls the actuator 120 to mechanically orient part of the vehicle 130 and/or part of a structure 140 in which the vehicle 130 is located to at least partly implement the action (block 550). As discussed above, according to particular aspects, the vehicle 130 is an aircraft 200, the idle state is a parked state, and the active state is an airborne state. In such aspects, the control signal controls the actuator 120 such that the aircraft 200 is able to transition from the parked state to the airborne state within the maximum time specified by the readiness criteria. Responsive to outputting the control signal, the method 500 ends (block 555).

Figure 6:
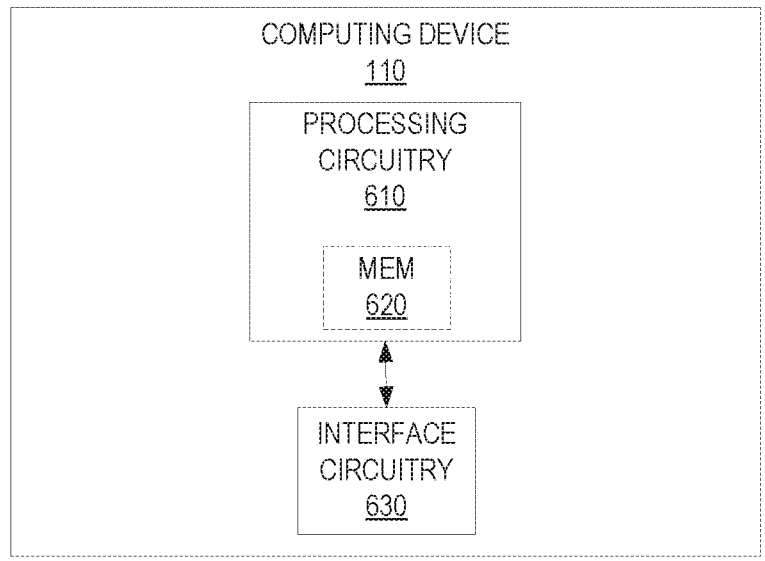
FIG. 6 is a block diagram of an example computing device according to an aspect of the present disclosure.

Further aspects of the present disclosure include the computing device 110 implemented according to the hardware illustrated in FIG. 6. According to the aspect illustrated in FIG. 6, the computing device 110 comprises processing circuitry 610 and interface circuitry 630. The processing circuitry 610 is communicatively coupled to the interface circuitry 630, e.g., via one or more buses. According to particular aspects of the disclosure, the processing circuitry 610 comprises one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. In one such aspect, the processing circuitry 610 includes programmable hardware capable of executing software instructions stored, e.g., as a machine-readable computer program in memory 620. Aspects of the memory 620 include any non-transitory machine-readable media known in the art or that may be developed, whether volatile or non-volatile, including (but not limited to) solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, individually or in any combination.

Aspects of the interface circuitry 630 include a controller hub configured to control the input and output (I/O) data paths of the computing device 110. The I/O data paths include data paths for exchanging signals over a communications network 105 and/or data paths for exchanging signals with a user. Accordingly, in some aspects of the present disclosure, the interface circuitry 630 includes a transceiver configured to send and receive communication signals over the network 105. In some aspects of the present disclosure, the interface circuitry 630 includes, for presenting visual information to a user, one or more of: a graphics adapter, a display port, a video bus, a touchscreen, a graphical processing unit (GPU), a display port, a Liquid Crystal Display (LCD), and/or a Light Emitting Diode (LED) display. In some aspects of the present disclosure, the interface circuitry 630 includes, for accepting input from a user, one or more of: a pointing device (e.g., a mouse, stylus, touchpad, trackball, pointing stick, joystick), a microphone (e.g., for speech input), an optical sensor (e.g., for optical recognition of gestures), and/or a keyboard (e.g., for text entry). According to particular aspects of the present disclosure, the interface circuitry 630 is implemented as a unitary physical component, or as a plurality of physical components that are contiguously or separately arranged, any of which may be communicatively coupled to any other, or may communicate with any other via the processing circuitry 610.

According to particular aspects of the present disclosure, the interface circuitry 630 is configured to send and receive data. The processing circuitry 610 is configured to obtain, via the interface circuitry 630, environmental data, capability data corresponding to a vehicle 130, and a readiness criteria specifying a maximum time to transition the vehicle 130 from an idle state to an active state. The processing circuitry 610 is further configured to determine an action that satisfies the readiness criteria and protects the vehicle 130 from a forthcoming environmental condition indicated by the environmental data. Determining the action is based on the environmental data, the capability data, and the readiness criteria. The processing circuitry 610 is further configured to output a control signal, via the interface circuitry 630 to an actuator 120, that controls the actuator 120 to mechanically orient part of the vehicle 130 and/or part of a structure 140 in which the vehicle 130 is located to at least partly implement the action.

Figure 7:
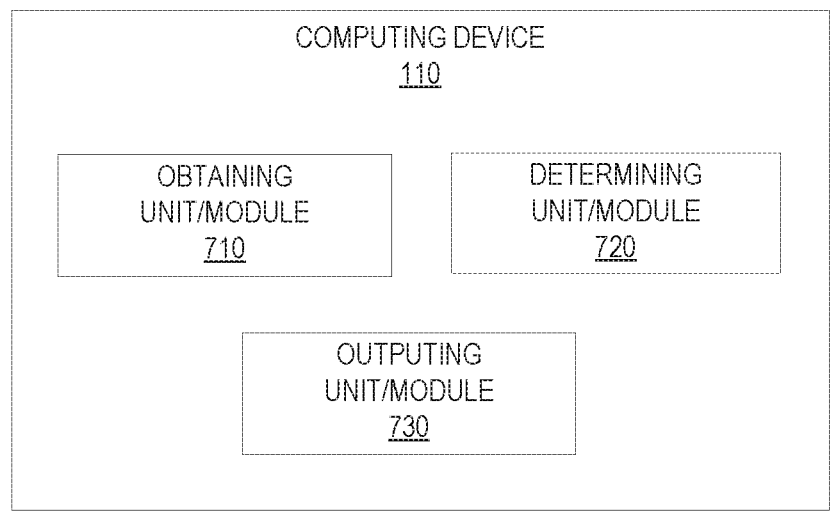
FIG. 7 is a block diagram of an example computing device according to an aspect of the present disclosure.

Aspects of the present disclosure further include the computing device 110 implemented according to the hardware units and/or software modules illustrated in FIG. 7 (e.g., as components of the processing circuitry 610 and/or instructions stored in the memory 620 of FIG. 6). The computing device 110 illustrated in FIG. 7 comprises an obtaining unit and/or module 710, a determining unit and/or module 720, and an outputting unit and/or module 730. The obtaining unit and/or module 710 is configured to obtain environmental data, capability data corresponding to a vehicle 130, and a readiness criteria specifying a maximum time to transition the vehicle 130 from an idle state to an active state. The determining unit and/or module 720 is configured to determine an action that satisfies the readiness criteria and protects the vehicle 130 from a forthcoming environmental condition indicated by the environmental data. Determining the action is based on the environmental data, the capability data, and the readiness criteria. The outputting unit or module 730 is configured to output a control signal, to an actuator 120, that controls the actuator 120 to mechanically orient part of the vehicle 130 and/or part of a structure 140 in which the vehicle 130 is located to at least partly implement the action.

Aspects of the present disclosure further include various methods and processes, as described herein, implemented using various hardware configurations configured in ways that vary in certain details from the broad descriptions given above. For instance, one or more of the processing functionalities discussed above may be implemented using dedicated hardware, rather than a microprocessor configured with program instructions, depending on, e.g., the design and cost tradeoffs for the various approaches, and/or system-level requirements outside the scope of the present disclosure.

Indeed, aspects of the present disclosure are, of course, carried out in other ways than those specifically set forth herein without departing from the essential characteristics therefrom. The aspects disclosed herein are to be considered in all respects as illustrative and not restrictive, and all changes coming within the meaning and equivalency range of the appended claims are intended to be embraced therein. In particular, although steps of particular processes or methods described herein are shown and described as being in a particular sequence or temporal order, the steps of any such processes or methods are not limited to being carried out in any particular sequence or order, absent an indication otherwise. Indeed, the steps in such processes or methods are generally carried out in various different sequences and orders according to particular aspects of the present disclosure while still falling within the scope of the present disclosure.

The invention claimed is:

1. A method, implemented in a computing device, the method comprising:
    obtaining environmental data, capability data corresponding to a vehicle, and a readiness criteria specifying an expected maximum time to transition the vehicle from an idle state that is not in use to an active state that is in use;
    determining an action that satisfies the readiness criteria and protects the vehicle from a forthcoming environmental condition indicated by the environmental data, wherein determining the action is based on the environmental data, the capability data, and the readiness criteria; and
    outputting a control signal, to an actuator, that controls the actuator to mechanically orient part of the vehicle and/or part of a structure in which the vehicle is located to at least partly implement the action.

2. The method of claim 1, wherein determining the action comprises using the environmental data, capability data, and/or readiness criteria to identify a previously-determined action from a database and to determine whether the previously-determined action was accepted or rejected.

3. The method of claim 1, wherein:
the vehicle is an aircraft, the idle state is a parked state, and the active state is an airborne state;
the control signal controls the actuator such that the aircraft is able to transition from the parked state to the airborne state within the maximum time.

4. The method of claim 1, wherein determining the action that satisfies the readiness criteria comprises determining that the vehicle is at a location suitable for satisfying the readiness criteria under the forthcoming environmental condition.

5. The method of claim 1, wherein:
determining the action that satisfies the readiness criteria comprises determining to secure the structure in which the vehicle is located against the forthcoming environmental condition;
outputting the control signal comprises outputting a signal to mechanically orient the part of the structure in which the vehicle is located.

6. The method of claim 1, wherein:
determining the action that satisfies the readiness criteria comprises determining to change a physical configuration of the vehicle to secure the vehicle against the forthcoming environmental condition;
outputting the control signal comprises outputting a signal to mechanically orient the part of the vehicle.

7. The method of claim 1, wherein determining the action comprises selecting the action from a plurality of preconfigured actions.

8. The method of claim 1, further comprising notifying a user of the action, wherein outputting the control signal is responsive to receiving notice that the action is accepted.

9. The method of claim 1, wherein the capability data indicates a safety threshold to transition the vehicle from the idle state to the active state.

10. A computing device comprising:
interface circuitry configured to send and receive data;
processing circuitry communicatively coupled to the interface circuitry, wherein the processing circuitry is configured to:
obtain, via the interface circuitry, environmental data, capability data corresponding to a vehicle, and a readiness criteria specifying an expected maximum time to transition the vehicle from an idle state that is not in use to an active state that is in use;
determine an action that satisfies the readiness criteria and protects the vehicle from a forthcoming environmental condition indicated by the environmental data, wherein determining the action is based on the environmental data, the capability data, and the readiness criteria; and
output a control signal, via the interface circuitry to an actuator, that controls the actuator to mechanically orient part of the vehicle and/or part of a structure in which the vehicle is located to at least partly implement the action.

11. The computing device of claim 10, wherein to determine the action, the processing circuitry is configured to:
use the environmental data, capability data, and/or readiness criteria to identify a previously-determined action from a database; and
determine whether the previously-determined action was accepted or rejected.

12. The computing device of claim 10, wherein:
the vehicle is an aircraft, the idle state is a parked state, and the active state is an airborne state;
the control signal controls the actuator such that the aircraft is able to transition from the parked state to the airborne state within the maximum time.

13. The computing device of claim 10, wherein to determine the action that satisfies the readiness criteria, the processing circuitry is configured to determine that the vehicle is at a location suitable for satisfying the readiness criteria under the forthcoming environmental condition.

14. The computing device of claim 10, wherein:
to determine the action that satisfies the readiness criteria, the processing circuitry is configured to determine to secure the structure in which the vehicle is located against the forthcoming environmental condition;
to output the control signal, the processing circuitry is configured to output a signal to mechanically orient the part of the structure in which the vehicle is located.

15. The computing device of claim 10, wherein:
to determine the action that satisfies the readiness criteria, the processing circuitry is configured to determine to change a physical configuration of the vehicle to secure the vehicle against the forthcoming environmental condition;
to output the control signal, the processing circuitry is configured to output a signal to mechanically orient the part of the vehicle.

16. The computing device of claim 10, wherein to determine the action, the processing circuitry is configured to select the action from a plurality of preconfigured actions.

17. The computing device of claim 10, wherein the processing circuitry:
is further configured to notify a user of the action via the interface circuitry;
is configured to output the control signal responsive to receiving notice that the action is accepted.

18. The computing device of claim 10, wherein the capability data indicates a safety threshold to transition the vehicle from the idle state to the active state.

19. A non-transitory computer readable medium storing a computer program product for controlling a programmable computing device, the computer program product comprising software instructions that, when executed on processing circuitry of the programmable computing device, cause the processing circuitry to:
obtain environmental data, capability data corresponding to a vehicle, and a readiness criteria specifying an expected maximum time to transition the vehicle from an idle state that is not in use to an active state that is in use;
determine an action that satisfies the readiness criteria and protects the vehicle from a forthcoming environmental condition indicated by the environmental data, wherein determining the action is based on the environmental data, the capability data, and the readiness criteria; and
output a control signal, to an actuator, that controls the actuator to mechanically orient part of the vehicle and/or part of a structure in which the vehicle is located to at least partly implement the action.

20. The non-transitory computer readable medium of claim 19, wherein to determine the action that satisfies the readiness criteria, the software instructions cause the processing circuitry to:
determine that the vehicle is at a location suitable for satisfying the readiness criteria under the forthcoming environmental condition;

determine whether to secure the structure in which the vehicle is located against the forthcoming environmental condition;

determine whether to change a physical configuration of the vehicle to secure the vehicle against the forthcoming environmental condition.

\* \* \* \* \*